June 6, 1961

D. S. LECRONE 2,987,089

ROLL SLICING MACHINE

Filed May 12, 1958

INVENTOR.
DALE S. LECRONE
BY
ATTORNEY

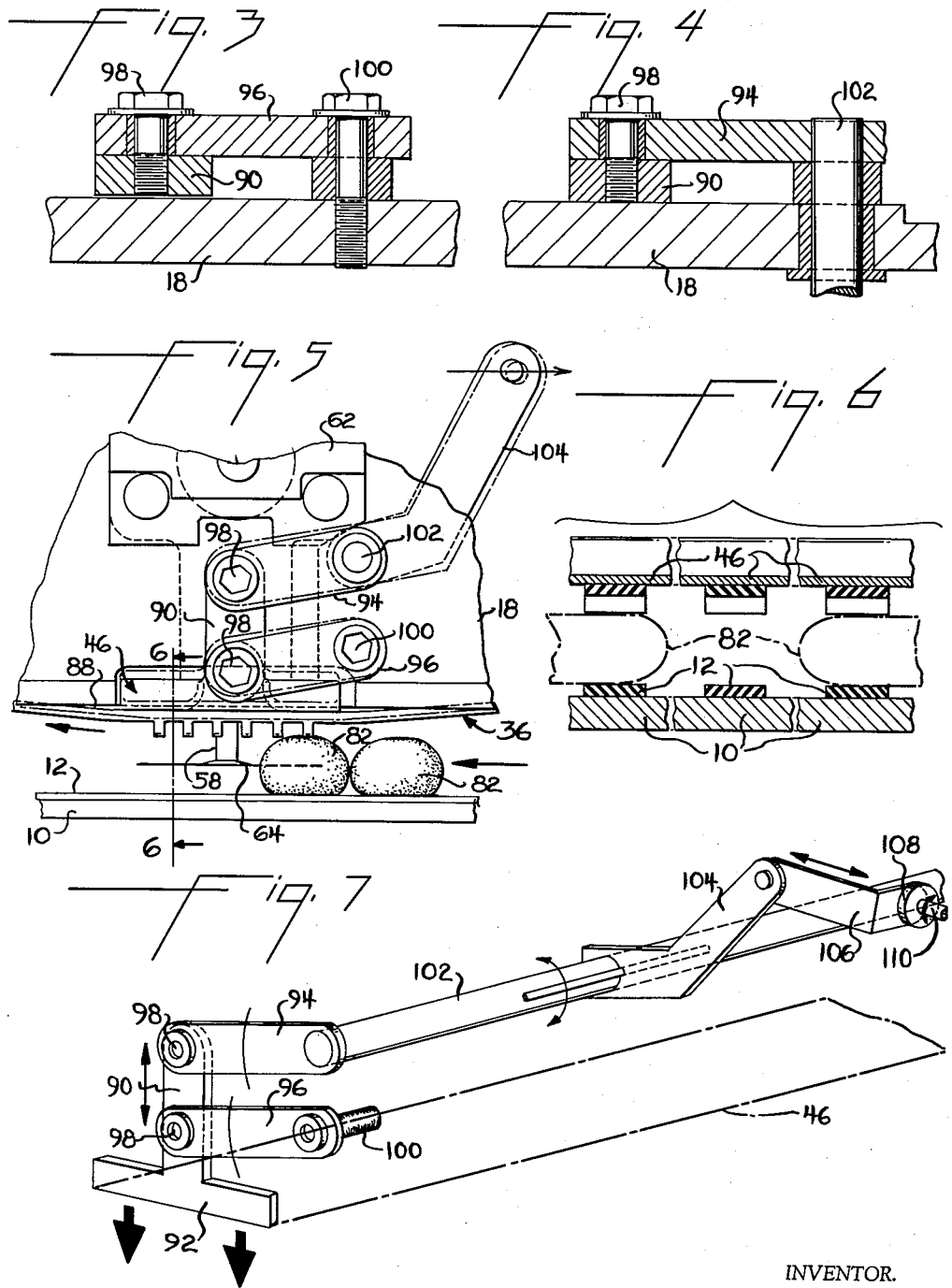

INVENTOR.
DALE S. LECRONE
BY
ATTORNEY

United States Patent Office 2,987,089
Patented June 6, 1961

2,987,089
ROLL SLICING MACHINE
Dale S. Lecrone, York, Pa., assignor to Alto Corporation, York, Pa., a corporation of Pennsylvania
Filed May 12, 1958, Ser. No. 734,694
10 Claims. (Cl. 146—73)

This invention relates to improvements in a roll slicing machine, and more particularly, in a roll slicing machine arranged to slice clusters of two or more baked rolls either of the circular hamburg-type roll or the elongated finger rolls commonly used with frankfurters.

This invention comprises an improvement over prior U.S. Patents Nos. 2,686,542, to Schmidt, and 2,811,997 to Schmidt et al. The roll slicing machines illustrated and claimed in said prior patents embody improved conveyor means for supporting clusters of rolls to be sliced. Rotatable disc knives spaced above said conveyor slice the rolls from one side toward the other, preferably not entirely slicing the rolls so as to leave what is referred to as a "hinge" portion which holds the top and bottom sliced sections of the rolls from being completely separated. To insure desired positioning of the clusters of rolls upon the conveyor, especially while being sliced, the machines also include a series of endless belts having courses positioned above the disc knives and engageable with the tops of the clusters of rolls so as to hold the same against the conveyor while being moved past the disc knives. In these machines, no means are provided for varying the vertical positions of the endless belts vertically relative to the conveyor other than by raising or lowering the entire frame which supports all of the belts as well as the knives and the power means for driving the same.

After the knives have been adjusted to dispose them at a desired level above the conveyor by regulating the height of the supporting frame relative to said conveyor, it is preferred that this position of the knives not be disturbed unless rolls of different sizes and particularly different heights from those for which the machine has been set are to be sliced. In the machines referred to in said prior patents, adjustment of the disc knives relative to their supporting frames is possible but such adjustment is tedious and time consuming. Hence, once the desired adjustment of the knives has been made upon the supporting frame so as to position the knives a desired distance above the conveyor, the vertical position of the frame usually is not changed. However, should the tops of the rolls not be properly engaged by the endless belts above the knives, the only way now possible of varying the engagement is to adjust the supporting frame vertically but such adjustment also will vary the position of the slicing knives relative to the conveyor and such latter adjustment is not desired once it has been established.

The machines described in said foregoing patents also include a plurality of shafts rotatably supported by the frame above the roll conveyor, the disc knives for slicing the rolls being affixed to the lower ends of said shafts. In accordance with the constructions described in said patents, said shafts all rotate uni-directionally. Particularly when a plurality of the disc knives are operated in a row extending transversely across said conveyor and above the same, and the knives are operated to slice individual or clusters of rolls, it is obvious that one side of the knife will be moving in the direction of movement of the conveyor, while the opposite side of the knife will be moving reversely thereto. Hence, when opposite sides of said knives respectively are slicing different rolls, there is a tendency for one of the knives to move the outermost roll rearwardly into the path of the next oncoming roll, unless all of the rolls are being engaged effectively by the endless belts mounted above the rolls and moving in the same direction as the conveyor to feed the rolls effectively to the disc knives. This difficulty particularly is evident in machines having in excess of two knives and the outermost knives slice the outermost sides of the rolls or clusters of rolls nearest the opposite sides of the machine.

The principal object of the present invention is to provide in roll slicing machines, of the type referred to in said prior patents, means which will permit vertical adjustment of the portions of the endless belts which are above the knives and engage the tops of the rolls to hold them firmly against the conveyor while being sliced, said means being adjustable in directions vertical to the plane of the conveyor and independently of the knives, whereby the vertical position of the knives relative to the conveyor may remain constant after it has been established when adjusting the machine to slice rolls of a predetermined height for example.

Another object of the invention comprising a corollary of the foregoing object is to provide plate-like means extending transversely across the supporting frame for the disc knives and endless belts which is engageable with the upper surfaces of the lower courses of said endless belts, said plate-like means being maintained substantially horizontal during all positions of adjustment relative to the disc knives, and supporting rolls around which the endless belts pass also being supported by the frame of the machine above the knives and one of said rolls being movable automatically and longitudinally of said frame to compensate for the movement of the belt by said plate-like means when the latter is adjusted to dispose the lower course of the belt at a different vertical position relative to the knives.

A further object of the invention is to provide preferably a single operating member by which the position of the plate-like means for adjusting the vertical position of the belts may be moved in directions vertical to the plane of the conveyor.

Still another object of the invention is to provide driving means for the disc knives which include means to cause the outermost knives to rotate in opposite rotary directions, whereby the inner sides of the disc knives both may be driven in the same direction as the movement of the conveyor which carries rolls to be sliced into engagement with the knives and past the same, whereby the outermost rolls adjacent opposite sides of the conveyor are not moved backwardly by either of said knives into the path of oncoming rolls.

Details of the foregoing objects and of the invention, as well as other objects thereof, are set forth in the following specification and illustrated in the accompanying drawings comprising a part thereof.

In the drawings:

FIG. 3 is an enlarged fragmentary horizontal sectional view taken on the line 3—3 of FIG. 2.

FIG. 4 is a view similar to FIG. 3 but being taken on the line 4—4 of FIG. 2.

FIG. 5 is an enlarged fragmentary side elevation of one side of the upper frame of the machine and illustrating particularly the linkage mechanism by which the pressure plate for positioning the endless belts is supported and operated, one position of the pressure plate and illustrated belt being shown in full lines, while an adjusted position thereof is shown in broken lines.

FIG. 6 is a fragmentary, foreshortened, vertical elevation taken on the line 6—6 of FIG. 5.

FIG. 7 is an enlarged fragmentary perspective skeletonized view illustrating the essential elements of the adjustable supporting means for one end of the pressure plate engageable with the endless belts.

Figure 8:
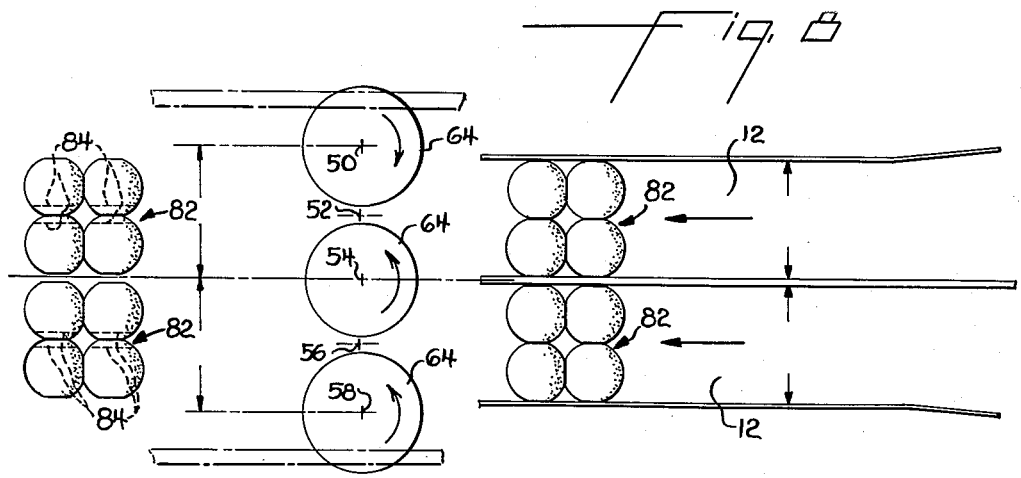
Figure 9:
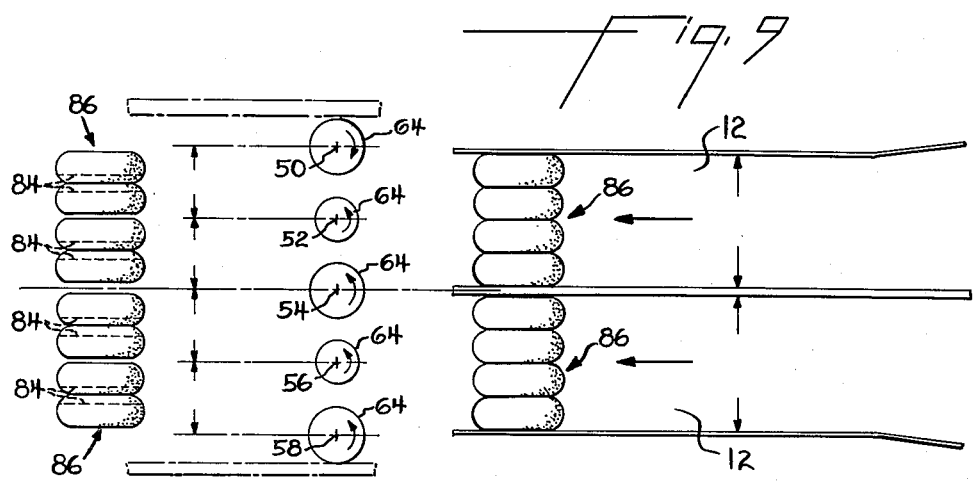

FIGS. 8 and 9 respectively are diagrammatic plan views illustrating the cutter layout of the machine for slicing clusters of circular hamburg rolls and clusters of elongated finger or frankfurter rolls, in accordance with the principles of the invention.

Only a sufficient portion of the roll slicing machine illustrated in the aforementioned patents is shown in the drawings to afford a basis for illustrating and describing the improvements thereover comprising the present invention. For additional details of said machine, attention is directed to said patents. The lower frame portion of the machine is not illustrated in the present drawings and it is to be understood that a bed plate 10 is supported by a suitable frame to maintain the plate 10 a desired distance above the floor of a bakery for example. Such bed plate is only fragmentarily illustrated in FIGS. 1 and 2.

Conveyor means 12, which may comprise either a plurality of parallel belts, or a unitary apron-type belt, is slidably supported upon the upper surface of bed plate 10 and is driven by conventional power means illustrated in detail in the aforementioned patents. Mounted above the conveyor 12 is an upper frame 14 comprising side plates 16 and 18 and transverse plates 20 and 22, there preferably being a pair of the latter for purposes of supporting an electric motor 24, or other suitable power means. The conveyor 12 preferably moves in the direction of the arrow shown in FIG. 2, whereby the left-hand end of the frame 14, as viewed in FIG 2, comprises the forward end thereof. The frame 14 preferably is pivotally connected by bearings 26 to the frame which supports the bed plate 10, whereby the rearward end of the frame 14 may be elevated to expose the equipment within the frame, particularly since the frame 14 preferably is entirely covered with a shield to not only enclose the equipment but also to provide safety for the operators.

Also extending transversely across the conveyor 12 between the side plates 16 and 18 are a pair of shafts 28 and 30, these shafts respectively supporting concentric rolls 32 and 34 around which a plurality of endless traction belts 36 extend. Any suitable means may be used to drive one of the rolls 32 or 34, one such means comprising extending one end of shaft 28 through the side plate 18 and connecting the projecting end of the shaft with any suitable power means, not shown. The belts 36 will be driven thereby and effect rotation of roll 34, the speed of rotation of the rolls being such as to cause the belts 36 to have a speed substantially the same as that of conveyor 12.

Shaft 30 projects at the opposite ends thereof through the side plates 16 and 18, horizontal slots 38 being formed in the side plates to accommodate the ends of shaft 30. Hence, the shaft 30 is adjustable longitudinally of the side plates 16 and 18. Bearing frames 40 are fixed to the exterior surfaces of side plates 16 and 18 and include bearing blocks 42 which rotatably support the opposite ends of shaft 30. Also fixed to each of the side plates in association with the bearing frames 40 is pressure block 44. Extending between blocks 44 and bearing blocks 42 are a plurality of coil springs 47 which force the bearing blocks 42 constantly away from shaft 28, thereby maintaining the traction belts under desired tension.

Elongated pressure means 46 extends between the side plates 16 and 18 and comprises a plate member having a central longitudinal slot 48 therein for purposes of permitting a plurality of shafts 50, 52, 54, 56 and 58 to extend therethrough, said shafts being supported by suitable bearing blocks 60 carried by transverse member 62 which is connected at its ends to the side plates 16 and 18. Said shafts have a plurality of disc blades 64 detachably connected to the lower ends thereof, all of said blades preferably being substantially within a common plane spaced above and parallel to the conveyor 12.

Figures 1, 2:
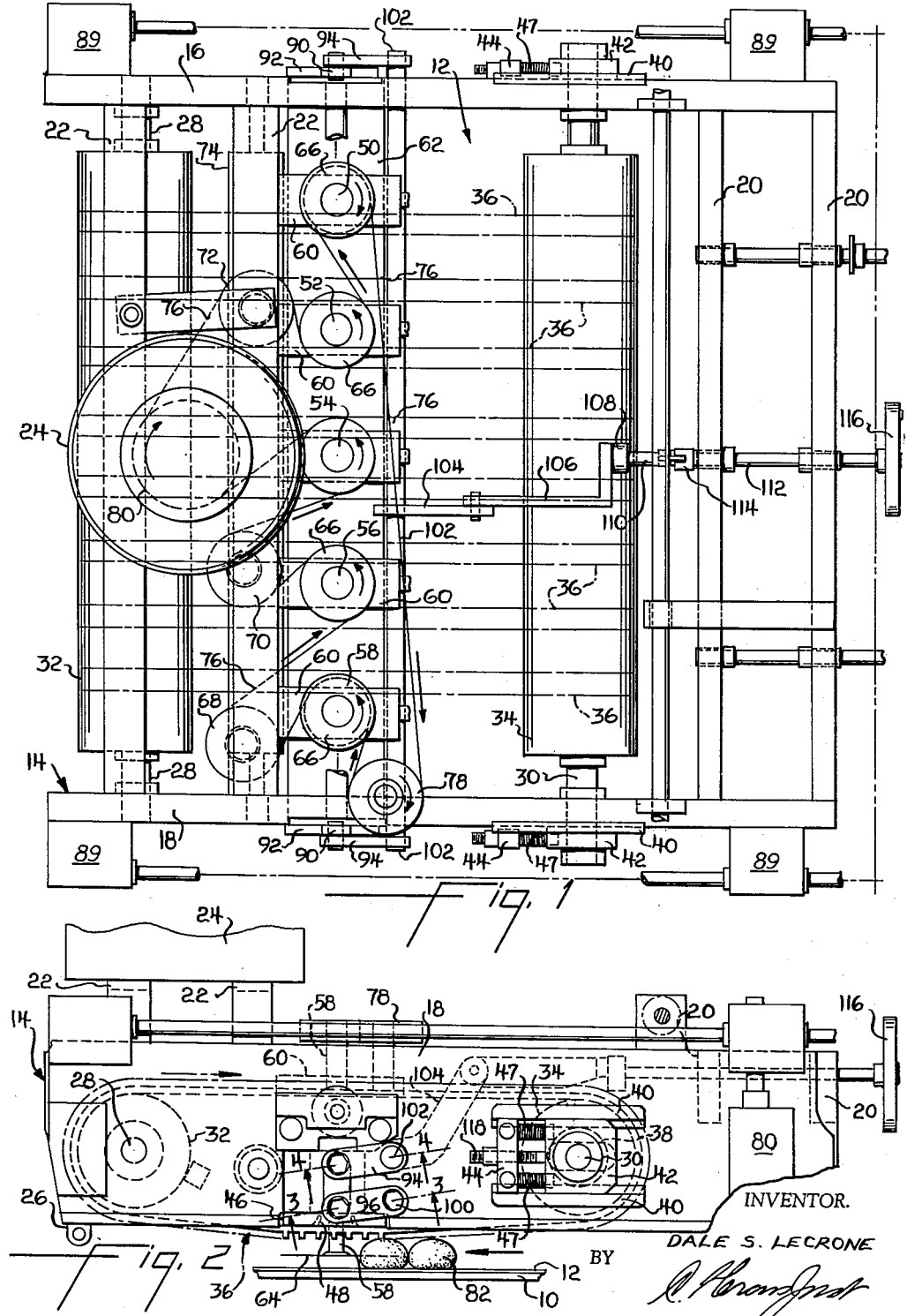
FIG. 1 is a top plan view showing the upper frame portion of a roll slicing machine embodying the principles of the present invention and especially illustrating the direction of movement of the drive means for the disc knives of the machine, as well as the adjusting means for the endless belts which engage the tops of the rolls to be sliced by the machine.
FIG. 2 is a side elevation of the upper frame means shown in FIG. 1, portions of the mechanism being broken away to decrease the size of the figure.

The upper ends of the shafts 50—58 have drive members 66 fixed thereto, these members comprising pulleys or sprocket gears for example. A plurality of idler members 68, 70 and 72 of similar size to the drive members 66, are supported by another transverse member 74 extending between side plates 16 and 18. The drive members 66 and the idler members 68, 70 and 72 preferably are all within a common plane parallel to the conveyor 12 and the idler member 72, for example, may be adjustably mounted and spring pressed for purposes of comprising a tightening means for the flexible, endless means, comprising either a belt or sprocket chain 76 extending around the drive members 66 and the various idler members 68, 70 and 72 in accordance with the arrangement clearly shown in FIG. 1. There is also still another idler member 78 which is supported adjacent the side plate 18 within the plane of the other idler members and drive members 66, the flexible means 76 also extending around idler 78 as indicated in FIG. 1.

The flexible drive means 76 also extends around a pulley or sprocket gear 80 which is connected to the lower end of the power shaft on motor 24 for example. Hence, as the motor rotates the drive pulley 80 in the direction of the arrow shown in FIG. 1, the flexible drive means 76 will move in the direction of the various arrows clearly shown in FIG. 1, whereby all of the drive shafts for the disc cutters, with the exception of shaft 50, will be driven counter-clockwise as shown in FIG. 1 in exemplary manner, while shaft 50 will be driven in clockwise direction.

The principal advantage of the above-described arrangement of cutters and the directions in which they are driven is that the two outermost cutters, respectively connected to shafts 50 and 58, will be driven so that the inner sides of said cutters will move in the direction of feed of the rolls 82. This is desirable in that the machine comprising the present invention is adapted to slice various types and sizes of rolls, particularly when the same are fed in clusters as illustrated diagrammatically in FIGS. 8 and 9. The knives 64, as shown in FIG. 8, are arranged to slice circular hamburg rolls 82 baked in clusters of four rolls each, whereby the knife on shaft 50 will slice the outermost rolls of one cluster while the knife on shaft 58 will slice the outermost rolls on the other cluster, especially when the clusters are moved in transverse rows relative to the knives. The knife on shaft 54 will slice the innermost rolls on both sets of clusters, resulting in the rolls of all clusters being sliced to the extent of the dotted lines 84 shown in FIG. 8.

Inasmuch as the knives 64 secured respectively to shafts 50 and 58 are rotated in opposite directions and the inner sides of the disc blades move in the direction of travel of the clusters of rolls upon conveyor 12, there is no tendency for the outermost rolls, for example, to tend to become detached from the clusters as would be the situation if, for example, the knife 64 on shaft 50 were rotating counter-clockwise. Should the latter be true, then there would be a tendency for the blade on shaft 50 to kick the rolls of the various clusters separate from the rolls on the inner sides of the clusters and backward into the path of the oncoming clusters of rolls, particularly under operating conditions where the upper surfaces of the rolls are not engaged as firmly as necessary by the roll engaging means 36 which are specifically illustrated as traction belts.

When the slicing machine is arranged to slice rows of elongated rolls such as finger or frankfurter rolls 86 arranged side by side in clusters, there will be a greater number of rolls to be sliced and, under such circumstances, all of the shafts 50 through 58 will have disc cutters 64 connected thereto, whereby the clusters of rolls 86 shown at the right-hand end of FIG. 9 will be sliced to the limit of the lines 84 shown on the left-hand end of FIG. 9 after passing the knives 64. In FIG. 9, it also will be seen that the knife on shaft 50 rotates clockwise, while all of the other knives rotate counter-clockwise, whereby the outermost knives rotate in opposite directions as in relation to the outermost knives in the three knife arrangement shown in FIG. 8 and in which figure the shafts 52 and 56 have no knives thereon. The knives 64 are readily connectable and disconnectable relative to the rotating shafts, whereby either of the arrangements shown in FIGS. 8 and 9 readily and quickly can be established.

After the blade arrangement upon the upper frame 14 has been established, for example, in accordance with the arrangement shown in FIGS. 8 and 9 or otherwise within the possibilities of the machine, the upper frame 14 is lowered into operative position and the frame 14 is raised or lowered relative to the conveyor 12 by adjustable means 89 at each corner of the frame. Such elevating means does not comprise part of the present invention. However, said elevating means will establish the slicing blades 64 at the desired elevation above conveyor 12 in regard to slicing any run of a specified size of roll. After the height of the slicing blades 64 has been adjusted, it is necessary to determine whether or not the lower courses 88 of the traction belts 36 effectively engage the tops of the rolls 82 as illustrated to advantage in FIG. 5. The elongated pressure means 46 serves to vary the engagement of the lower courses 88 of the traction belts relative to the tops of the rolls 82 and details of such elongated pressure means now will be described.

The pressure means 46 preferably comprises a stamped, sheet metal plate having the slot 48 preferably centrally thereof for purposes of receiving the shafts 50 through 58 for the cutters 64. Referring to FIG. 7, it will be seen that a pair of T-shaped members 90 are located adjacent the side plates 16 and 18 on the exterior surfaces thereof and are vertically movable in unison. The horizontal, lower head 92 of the members 90 is maintained substantially horizontal and parallel to the conveyor 12 by a pair of links 94 and 96, one end of each of said links respectively being pivoted to spaced portions of the members 90 by pintles 98. The opposite end of link 96 is secured by a bolt 100 to the side plates 16 and 18 respectively at opposite sides of the upper frame 14, said opposite ends of links 94 being oscillatable about the bolts 100.

An actuating shaft 102 extends transversely between the side plates 16 and 18 of the upper frame 14, the opposite ends of said shaft extending through suitable bearing apertures in said side plates. The ends of the upper links 94 opposite those which are connected to pintles 98 are secured respectively and fixedly to the opposite ends of actuating shaft 102.

Intermediately of the ends of shaft 102, an actuating arm 104 is fixed at one end to shaft 102 and an L-shaped bracket member 106 is pivotally connected at one end to the other end of arm 104 as clearly shown in FIG. 7. The opposite end of bracket member 106 has a threaded nut portion 108 which engages the threaded end of actuating rod 110. Another actuating rod 112 is supported between fixed bearings carried by transverse plates 20, as shown in FIG. 1, and the innermost end of rod 112 is connected to the other end of rod 110 by a universal joint 114. Suitable operating means such as a hand wheel 116 is connected to the outer end of actuating rod 112.

It will be seen from the foregoing that when it is desired to depress the lower courses 88 of the traction belts 36 against the tops of the rolls 82 for example, the hand wheel 116 is rotated in one direction to move the bracket 106 and upper end of arm 104 forwardly, thereby rotating the actuating shaft 102 counter-clockwise as viewed in FIG. 5, thereby depressing the T-shaped members 90 and the plate-like pressure means 46 into engagement with the upper surfaces of the lower courses 88 of the traction belts 36. Such depressing of these courses of the traction belts continues until desired amounts of engagement are achieved. Due particularly to the threaded engagement of one end of shaft 110 with the nut portion 108 on bracket 106, stopping of the rotation of the hand wheel 116 is all that is necessary at the conclusion of the setting of the position of the pressure means 46 and such position will be held during operation of the machine by such threaded connection.

Conversely, if it is desired to elevate the pressure means 46, the head wheel 116 is rotated in the opposite direction to effect such upper movement. In all of the movements of the pressure means 46, the plate member which extends transversely across all of the lower courses of the traction belts 36 will be maintained substantially parallel to the conveyor 12 due to the links 94 and 96 at opposite sides of the upper frame of the machine. The upper surfaces of the traction belts 36 freely and slidably engage the lower surface of the pressure plate 46, the latter preferably being highly polished for this purpose, whereby no undue wear upon the belts is caused by the pressure plate during operation of the belts.

During either elevation or depression of the lower courses of the traction belts 36, variations between the centers of the shafts 28 and 30 will occur. However, the springs 47 which engage the bearing blocks 42 will serve to keep adequate tension upon the traction belts 36 and stop means for limiting the movement of the shaft 30 relative to the shaft 28 are provided in the nature of threaded bolts 118 which extend through threaded openings in the pressure blocks 44 at opposite sides of the machine. When for example the lower courses 88 of the traction belts are depressed, the springs 47 will be compressed and permit the shaft 30 to move toward the shaft 28, thereby avoiding damage such as undue stretching of the traction belts 36.

From the foregoing, it will be seen that the present invention provides simple and effective means for readily adjusting the traction belts into desired engagement with the tops of rolls being moved to the slicing blades. Further, the pressure means 46 which engage the lower courses of the traction belts have portions respectively disposed at opposite sides of the shafts which support the slicing blades, whereby the desired amount of pressure upon the rolls is maintained at the location where it will be needed most, namely, adjacent the slicing blades.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. A machine for slicing rolls comprising in combination, conveyor means movable along a substantially horizontal path to support and move rolls to be sliced along said path, a frame positioned above said horizontal conveyor means, a plurality of shaft means supported by said frame for rotation about axes extending substantially perpendicularly to said conveyor means, disc knife members carried respectively by said shaft means and positioned substantially within a common plane parallel to said conveyor means, said knife members intersecting the path of said rolls as moved by said conveyor means and operable to partially sever the same, endless belt means supported by said frame movable above said knife members and having lower courses extending within a common plane above said knife members and substantially parallel to said conveyor means, said belt means being positioned transversely at opposite sides of said shaft means and said courses thereof directly engaging the tops of rolls as moved along the paths thereof by said conveyor means, elongated plate means extending transversely across the upper surfaces of the lower courses of said belt means adjacent said shaft means and directly engaging said lower courses, said plate means having opening means therein through which said shaft means extend, and vertically adjustable means movable relative to said frame and supporting said elongated plate means for vertically adjustable movement relative to said frame while maintaining said plate means parallel to said knife members and thereby being operable to vary the distance between said lower courses of said belt means and said knife means to control engagement of said belt means with the tops of said rolls.

2. The machine set forth in claim 1 further characterized by said vertically adjustable supporting means comprising pairs of links movably supported upon opposite sides of said frame and interconnected to said plate means, said pairs of links being mounted one above the other in each pair and operable to maintain said plate means parallel to said knife means in all positions of adjustment thereof.

3. The machine set forth in claim 2 further including shaft means extending transversely across said frame and connected to one end of one link of each pair at opposite sides of said frame, means pivotally connecting one end of the other link of each pair to said frame, means extending between and pivotally interconnected to the opposite ends of both links of each pair, and means connected to said shaft and operable to oscillate the same in opposite directions respectively to move said plate means toward and from said knife means while maintained parallel thereto.

4. The machine set forth in claim 3 further characterized by said means for oscillating said shaft comprising a lever fixed at one end to said shaft, and threaded shaft means threadably engaging the other end of said lever and operable when rotated to oscillate said shaft, said threaded means serving to maintain the adjusted position of said shaft when said threaded shaft means is not being rotated.

5. A machine for slicing rolls comprising conveyor means movable along a substantially horizontal path to support and move therealong rolls to be sliced, a plurality of knives supported within a plane parallel to said horizontal conveyor means and spaced transversely apart and thereabove, said knives being positioned within the path of rolls carried by said conveyor means and arranged to partially slit said rolls, roll engaging means supported independently of the knives and positioned substantially parallel to and in spaced relationship above and between adjacent knives and operable directly to engage the tops of rolls supported upon said conveyor means to hold said rolls directly upon said conveyor means while moved thereby past said knives to be sliced, means supporting said roll engaging means for movement generally in the direction of the movement of said conveyor means and also substantially toward and away from said knives, and adjustable means directly engaging said roll engaging means from above and operable to vary the vertical position thereof relative to said knives to adapt said roll engaging means suitably to engage the tops of rolls of different thicknesses.

6. The roll slicing machine set forth in claim 5 further characterized by said roll engaging means comprising endless flexible belt-like members having vertically spaced upper and lower courses and the lower courses thereof engaging the rolls while being sliced, said lower courses being adjustable vertically relative to the plane of said knives.

7. The roll slicing machine set forth in claim 5 further characterized by said knives being disc knives individually supported by rotatable shafts to operate substantially within a common plane parallel to and above said conveyor means a predetermined distance.

8. The roll slicing machine set forth in claim 6 further characterized by said knives being disc knives individually supported upon shafts extending between adjacent belt-like members and the knives being positioned within a plane between said conveyor means and lower courses of said belt-like members.

9. The roll slicing machine set forth in claim 5 further including a frame positioned substantially stationarily above said conveyor means and supporting said knives and supporting means for said roll engaging means, and said frame carrying operating means for said adjusting means, said operating means having a manually engageable member positioned exteriorly of said frame and remote from said knives.

10. The roll slicing machine set forth in claim 6 further including a plurality of elongated rotatable members supporting said belt-like members in said spaced parallel relationship to each other, one of said supporting members being mounted for rotation about a fixed axis parallel to said conveyor means and the other supporting member being mounted for rotation about an axis parallel to but movable toward and from the axis of said one supporting member to compensate for adjustment of the lower courses of said belt-like members, and means yieldably urging said other rotatable member away from said one rotatable member.

References Cited in the file of this patent

UNITED STATES PATENTS

| | | |
|---|---|---|
| 993,173 | Karhu | May 23, 1911 |
| 1,766,450 | Ost | June 24, 1930 |
| 2,126,226 | Smith et al. | Aug. 9, 1938 |
| 2,361,615 | Elrod | Oct. 31, 1944 |
| 2,669,269 | Schmidt | Feb. 16, 1954 |
| 2,710,637 | Fish | June 14, 1955 |
| 2,753,907 | Schmidt et al. | July 10, 1956 |

FOREIGN PATENTS

| | | |
|---|---|---|
| 120,300 | Great Britain | Nov. 7, 1918 |
| 249,652 | Great Britain | Apr. 1, 1926 |